United States Patent [19]

Imran et al.

[11] Patent Number: 4,864,115

[45] Date of Patent: Sep. 5, 1989

[54] ELECTRONIC ACCESS CARD HAVING KEY PADS AND COILS AND COMBINATION USING THE SAME

[75] Inventors: Mir A. Imran, Palo Alto; Keith S. Clark, Sunnyvale, both of Calif.

[73] Assignee: DataTrak, Inc., Mountain View, Calif.

[21] Appl. No.: 899,533

[22] Filed: Aug. 22, 1986

[51] Int. Cl.⁴ ............... G06F 15/21; G06K 5/00
[52] U.S. Cl. ................... 235/492; 235/382.5; 235/493; 235/449; 340/825.31
[58] Field of Search ............... 235/380, 382, 487, 488, 235/492, 493, 441, 449, 382.5; 340/825.31, 825.34; 902/26

[56] References Cited

U.S. PATENT DOCUMENTS

| | | | |
|---|---|---|---|
| 4,066,873 | 1/1978 | Schatz | 235/487 |
| 4,277,837 | 7/1981 | Stuckert | 235/380 |
| 4,605,844 | 8/1986 | Haggan | 235/380 |
| 4,609,780 | 9/1986 | Clark | 340/825.31 |
| 4,614,861 | 9/1986 | Pavlov et al. | 235/380 |
| 4,650,981 | 3/1987 | Foletta | 235/492 |
| 4,692,601 | 9/1987 | Nakano | 235/487 |
| 4,692,604 | 9/1987 | Billings | 235/493 |
| 4,727,368 | 2/1988 | Larson et al. | 340/825.31 |
| 4,766,746 | 8/1988 | Henderson et al. | 340/825.31 |

Primary Examiner—Vincent P. Canney
Assistant Examiner—Robert A. Weinhardt
Attorney, Agent, or Firm—Flehr, Hohbach, Test, Albritton & Herbert

[57] ABSTRACT

Electronic access card comprising a printed circuit board. A microprocessor is carried by the printed circuit board. A plurality of keys are carried by the board. A matrix connects the keys to the microprocessor. A clock is coupled to the microprocessor. A battery is carried by the printed circuit board and coupled to the microprocessor. A coil serving as a transducer is carried by the printed circuit board and is coupled to the microprocessor and to the battery so that when keys are operated the keys are polled by the microprocessor and information is obtained from the keys supplied by the microprocessor to the transducer.

9 Claims, 2 Drawing Sheets

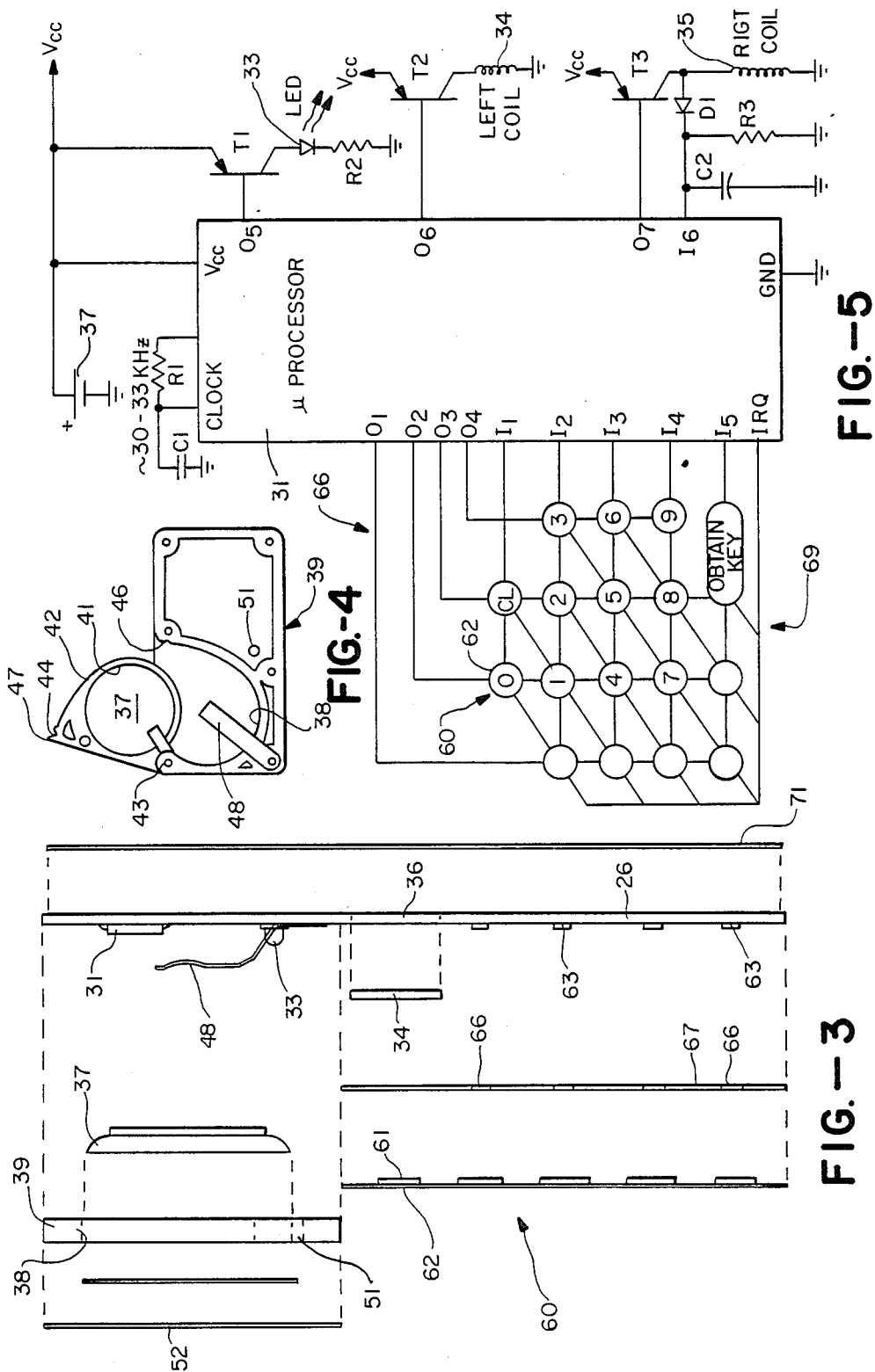

ELECTRONIC ACCESS CARD HAVING KEY PADS AND COILS AND COMBINATION USING THE SAME

This invention relates to an access card having key pads and at least one coil, and more particularly, to such an access having bi-directional communication capabilities and a combination utilizing the same.

In U.S. Pat. No. 4,609,780, there is disclosed a lock box and a card for obtaining access to the same. In one embodiment of the card the card had to be slidably moved by the user with respect to the lock box. It has been found that although such a card operates satisfactorily, there are certain situations in which it is difficult to accomplish the necessary sliding movement of the card to obtain access to the box. There is therefore a need for a new and improved card for use with lock boxes of the type hereinbefore described as well as with other types of mechanisms designed for secure applications. In general, it is an object of the present invention to provide an electronic access card which can be readily used with lock boxes and other mechanisms requiring secure entry.

Another object of the invention is to provide an access card of the above character which provides high security.

Another object of the invention is to provide an access card of the above character which has computing capabilities.

Another object of the invention is to provide an access card of the above character in which the identification of the user can be encrypted into the access card.

Another object of the invention is to provide an access card of the above character which has a plurality of key pads and at least one coil.

Another object of the invention is to provide an access card of the above character which has bi-directional communication capabilities.

Another object of the invention is to provide an access card of the above character in which at least one coil is embedded in the card.

Another object of the invention is to provide an access card of the above character having a memory and which is capable of storing data in its memory.

Another object of the invention is to provide an access card of the above character which is capable of transmitting the information entered through the key pad.

Another object of the invention is to provide an access card of the above character which is capable of transmitting the information to a receiving device after a programmed delay.

Another object of the invention is to provide an access card of the above character which is capable of transmitting the same information repetitively to a receiving device.

Another object of the invention is to provide an access card of the above character in which the hours of use an be predetermined by use of an internal real time clock.

Another object of the invention is to provide an access card of the above character which has low power requirements.

Another object of the invention is to provide an access card of the above character in which radio frequency communication can be carried out either in simplex or duplex format.

Another object of the invention is to provide an access card which permits the use of audio communication.

Another object of the invention is to provide an access card of the above character which has readily replaceable batteries.

Another object of the invention is to provide an access card of the above character which is small in size.

Another object of the invention is to provide an access card of the above character which has a long life.

Another object of the invention is to provide an access card of the above character which can be readily manufactured.

Another object of the invention is to provide an access card of the above character in which the electronics utilized therein is dormant during substantially major portions of the time when the access card is not in use to minimize battery drain.

Another object of the invention is to provide an access card of the above character which gives an indication when the battery is low.

Another object of the invention is to provide an access card of the above character in which the personal code utilized therein can be readily reprogrammed.

Another object of the invention is to provide an access card of the above character which is relatively thin so that it can fit in a billfold.

Another object of the invention is to provide an access card of the above character which utilizes a microprocessor.

Another object of the invention is to provide an access card of the above character which produces electromagnetic output pulses.

Another object of the invention is to provide an access card of the above character which facilitates rekeying of a lock box system.

Another object of the invention is to provide a lock box which can be utilized with the access card of the present invention.

Another object of the invention is to provide an access card which automatically invalidates itself after a predetermined amount of time or on a predetermined date and can be reactivated by entering a unique code number through the key pads of the card.

Another object of the invention is to provide a combination of an access card of the above character and a lock box.

Another object of the invention is to provide an access card which is low in cost.

Additional objects and features of the invention will appear from the following description in which the preferred embodiments are set forth in detail in conjunction with the accompanying drawings.

FIG. 3 is an enlarged exploded view of the electronic access card shown in FIGS. 1 and 2.

FIG. 4 is an enlarged view of the chassis used in the electronic access card.

FIG. 5 is a circuit diagram of the access card.

In general, the access card of the present invention is comprised of a printed circuit board. A microprocessor is carried by the printed circuit board. A plurality of keys are also carried by the board and a matrix is provided connecting the keys to the microprocessor. A clock is coupled to the microprocessor. A battery is carried by the printed circuit board and coupled to the microprocessor. Coil means serving as a transducer is carried by the printed circuit board and is coupled to the microprocessor and to the battery whereby when keys are operated the keys are polled by the microprocessor and information is supplied by the microprocessor to the transducer.

Figure 2:
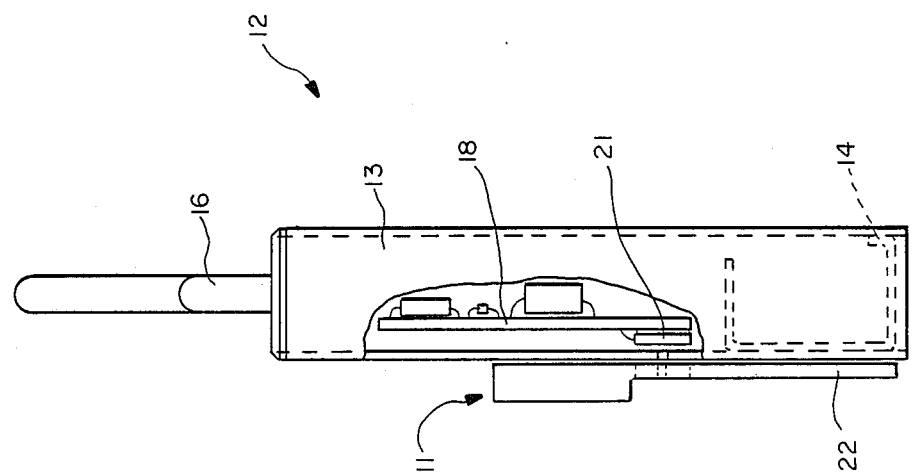
FIG. 2 is a side elevational view of the electronic access card shown in FIG. 1 inserted into a lock box with certain portions broken away.
Figure 1:
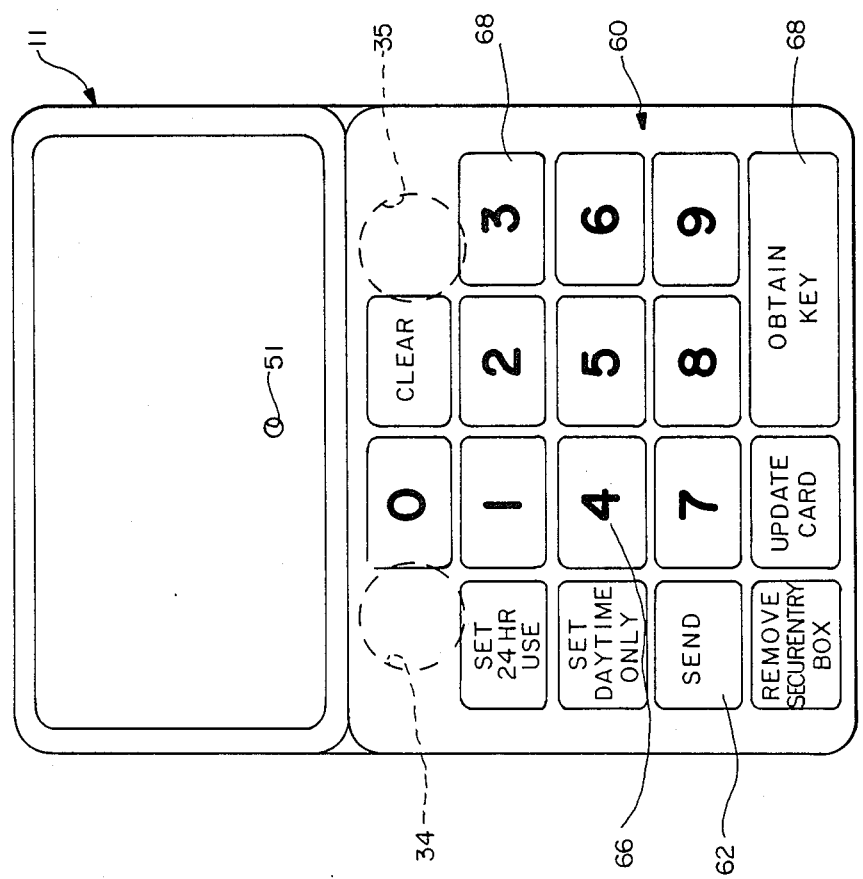
FIG. 1 is an enlarged front elevational view of an electronic access card incorporating the present invention.

More specifically, the electronic access card 11 which is shown in FIG. 1 can be identified as a "smart" card which has microprocessor or computing capabilities. The card 11 is adapted to be utilized in a lock box 12 of the type described in U.S. Pat. No. 4,609,780. As described therein, the lock box consists of a case 13 which is provided with a key container or compartment 14 that is movable between key retaining and key access positions. It is also provided with a shackle 16 which is movable between locked and unlocked positions. A printed circuit (PC) board 18 is provided within the case 13. As described in U.S. Pat. No. 4,609,780, the printed circuit board 18 includes circuitry which is connected to sensor means carried by the PC board which can be in the form of at least one coil as, for example, two coils 21. The sensor 21 can be of any suitable type. For example, it can be a Hall effect transducer for sensing the changes in magnetic field created by the card 11. Alternatively, it can be a radio frequency coil for sensing radio frequencies. As is also disclosed in U.S. Pat. No. 4,609,780, spaced parallel guide members 22 are provided on the front side of the case 13 and are adapted to receive the card 11 and hold it in a predetermined position with respect the case 13 and the sensor means 21.

The electronic access card 11 consists of a printed circuit (PC) board 26 of a suitable insulating material. The PC board 26 is formed of a conventional insulating material and can have a thickness of approximately 0.015–0.02", a height of 3" and a width of 2.15". A number of electronic components are mounted on the PC board in a conventional manner. As hereinafter explained, the electronics can include two capacitors, 3 resistors, 3 transistors and 1 diode, all of which are not shown in FIG. 3. The electronics also includes a microprocessor 31 of a conventional type.

The microprocessor 31 as well as other electronic components are mounted near the upper left-hand side of the board 26 as viewed from FIG. 1. A source of light in the form of light emitting diode 33 is also mounted on the PC board 26. Sensor means in the form of at least one coil is provided. As shown two spaced apart radio frequency coils 34 are mounted in recesses 36 provided in the printed circuit board 26. The coils 34 are positioned in the PC board in a position so that when the card 11 has been positioned in the guides 22 on the lock box 12 the coils 34 are opposite the Hall effect sensors 21 in the lock box 12. The coils can have a suitable diameter as, for example, 0.350 of an inch.

A coin-type lithium battery 37 is adapted to be disposed within a recess 38 provided in a chassis 39. The chassis 39 has a generally rectangular configuration and is formed of a suitable material such as plastic. The battery 37 is removably mounted in a circular recess 41 in a battery hatch 42 also formed of a suitable material such as plastic. The battery hatch 42 is pivotally mounted by a pin 43 on the chassis 39 and is adapted to be retained in the recess 38 in the chassis 39 by a detent 44 on the hatch 42 engaging a recess 46 in the chassis 39.

The hatch 42 is provided with a protrusion 47 adapted to be engaged by a fingernail of a hand to pull the battery hatch 42 and battery 37 carried thereby to overcome the frictional engagement of the detent 44 to permit replacement of the battery 37. Another plus battery contact 48 is carried by the chassis 39 and extends into the recess 38 so that it can be engaged by the battery 37 carried by the pivotally mounted battery hatch 42. The chassis 39 can be secured to the PC board 26 by suitable means such as an adhesive or rivets. The chassis 39 is provided with an opening 51 which overlies the light emitting diode 33. A label 52 can contain suitable indicia such as a trademark and the name and address of the organization distributing the card.

The electronic access card 11 also includes means for inserting information into the microprocessor and other electronics associated with the card and with the embodiment shown in FIG. 1 takes the form of switches 60. The switches 60 consist of spaced apart contacts 61 carried by key pad 62 formed of an insulating material which has some springiness as, for example, a plastic membrane or member. The contacts 61 can be formed of a suitable material such as conductive carbon or silver ink which can make contact with contacts 63 of a type similar to the contacts 61 and carried on the printed circuit board 18 through spaced apart holes 66 provided in a spacer or insulating member 67. The spacer 67 can be provided with an adhesive on both sides so that it can be secured to the printed circuit board 26 and also for securing the key pad to the spacer 67 to provide a completed assembly. The contacts 61 and 63 form switches 68 which are closed when the key pads 62 can be provided with suitable indicia 68 as shown in FIG. 1. Thus there are provided key pads for Arabic numerals from 0 to 9. In addition, there are provided key pads with the following function:

CLEAR/ON
SET 24 USE
SET DAYTIME ONLY
REMOVE SECURENTRY BOX
UPDATE CARD
OBTAIN KEY

The manner in which the switches 60 are interconnected into the circuitry provided on the PC board 26 and forming a part of the electronic access card 11 is shown in FIG. 5. Also shown in FIG. 5 are the various electronic components which are provided on the PC board 26 which include the two capacitors C1 and C2, three transistors T1, T2 and T3, three resistors R1, R2, and R3, diode D1 as well as the light emitting diode 33, the battery 37, the coils 34 and 35 and the microprocessor 31. The resistor R1 and the capacitor C1 are connected to the microprocessor 31 and provide a clock which has a frequency ranging from 30 to 33 kilohertz.

When one of the key pads 60 is depressed as shown in FIG. 5, a signal will be sent on the IRQ line which is common to all of the switches to wake up the microprocessor 31. To determine which key pad 62 is depressed, a matrix 69 is provided which is connected to the key pads 62 and to the microprocessor 31. The microprocessor 31 polls the matrix 69 by polling the output lines $O_1$ through $O_4$ and the input lines $I_1$ through $I_5$ to determine which key pad 62 is being pressed.

The microprocessor 31 can be of a suitable size. For example a four bit microprocessor is adequate to serve the requirements of the card 11. However, an 8 bit microprocessor can be utilized if desired. The key criteria for selecting the microprocessor is that it have very low power requirements and that it provides input and output lines to be able to read the keyboard and drive the necessary outputs. The microprocessor can also provide an onboard ROM and an onboard scratch pad and memory RAM. The ROM is utilized for storing the software program that is utilized in the electronic access card.

The battery 37 which is provided as a part of the electronic access card can have a suitable voltage as, for example, three volts and is connected between ground and the $V_{CC}$ pin of the microprocessor. The microprocessor is operated with a clock that is depicted as a RC combination in the form of a resistor R1 and a capacitor C1 to operate at a suitable frequency as, from 30 to 33 khz. It should be appreciated that if desired a quartz crystal could be utilized for operating the clock in place of the RC network. The RC network is utilized in the present application in place of a quartz crystal because precise timekeeping is not required for the microprocessor. The accurate timekeeping required by the system is provided in the lock box 12 as described in U.S. Pat. No. 4,609,780.

The transistor T1 is utilized for driving the light emitting diode 33 and the transistors T2 and T3 are utilized for driving the coils 34 and 35. The light emitting diode 33 is utilized to give visual feedback to the user whenever a key is depressed. The $O_5$ output of the microprocessor turns on the transistor T1 so as to deliver sufficient power, as for example, five milliampheres to drive the LED 33 through the current limiting resistor R2 which can have a value ranging from 100 to 500 ohms.

The output $O_6$ is connected to the transistor T2 and turns on the transistor T2 to drive the left coil 34. Similarly, the output $O_6$ of the microprocessor turns on the transistor T3 to drive the right coil 35. A diode rectifier D1 is connected to the output of the transistor T3 and is connected through an RC filter formed of the resistor R3 and the capacitor C2 and to the input $I_6$ of the microprocessor 31. This circuitry provides a rectified signal to the microprocessor 31 which is utilized during the actual programming of the electronic access card 11. The capacitor C1 can have a certain value as, for example, a value of 100 picofarads where the resistor R3 can have a value ranging from 100 kilo-ohms to 500 kilo-ohms.

A label 71 is provided on the rear side of the PC board 26. This rear label can be utilized for providing information for the user in using the card and also may carry information for programming the card. For example, it can be provided with a Securentry TM number as well as a call-in date. These two pieces of information which are provided on the label 71 are also encoded into a conventional optical bar code 71 provided on the label. Each card when it is being produced is provided with a unique identification number and a call in date number that is to be supplied to the user of the electronic access card. For security reasons, these two numbers have been incorporated on the label 71 and in the optical bar code. This optical bar code is read during the production process and the information is incorporated into the memory of the microprocessor.

The right coil 35 during the programming mode becomes the receiving coil and receives the RF information which is rectified and filtered and supplied to the microprocessor which reads the data. The transmission which is received is in pulse width modulation format utilizing a 10 khz to 100 khz amplitude modulated RF signal.

It should be appreciated that if a battery is removed and an electronic access card forgets its unique identification number the card can be reprogrammed in the field by utilizing a bar code reader which would read the bar code and transmit the RF information through the right coil 35.

As an alternative procedure, the unique code and the call-in date could be entered into the card programmer manually, as for example, by typewriting. This, however, makes it possible for human error to occur. The use of the bar code in programming directly from the bar code into the coil of the electronic access card prevents such an error from occurring.

The manner in which an electronic access card would be utilized in a real estate board as a typical application of the card is as follows. A real estate agent of a real estate board upon paying a predetermined fee to the real estate board would be given an electronic access card 11. The realtor receiving the card would select a four digit number of his own choosing and give that information to the operator of the real estate board. The operator at the real estate board would type this four-digit number into a computer. The card would then be placed in the optical bar code reader which would read the bar code of the card and it would take this information plus the four digit number selected by the real estate agent and this would be programmed or encrypted into the memory of the microprocessor through the right coil 35. After the card had been programmed in this manner, it would be given to the real estate agent for use in connection with the lock boxes utilized by the real estate board.

In the event it is necessary to remove the battery from the smart card 11, a backup battery source is provided on the card to prevent loss of stored information from the memory.

The real estate agent during the initial update or in a subsequent call-in date would pick up a touch tone telephone and would call the real estate board. After the real estate board and its computer is on-line, the real estate agent would type into the keyboard of the touch tone phone the five-digit securentry or identification number that is on the back of the card 11. A seven-digit number would be produced by the computer at the real estate office. This seven-digit number would be entered into the card key pad by the real estate agent followed by pressing the UPDATE CODE key.

With the electronic access card's so updated, the real estate agent is capable of showing a property listed with that real estate board and which is fitted with lockboxes of the type described in U.S. Pat. No. 4,609,780. When the real estate agent arrives at the lock box for the property to be shown, the real estate agent will type in the four digit access code which he had chosen at the real estate board and which was programmed into the electronic access card. After the four-digit access card has been typed in, the "obtain key" should be depressed. The electronic access card is programmed to send out periodic bursts of information which consists of a series of pulses on the right and left coils 34 and 35.

In one embodiment of the invention each burst of information was comprised of a plurality of pulses which are a fraction of a second wide with a gap in between them so that the burst of information would occur during a period of less than one second. This burst of information would be repeated every two seconds for the next 20 seconds. This gives a real estate agent 20 seconds in which to turn on the lock box and insert the electronic access card into it. At any time during the 20 seconds the lock box will be awakened and will perform the requested functions. As explained in U.S. Pat. No. 4,609,780, the lock box 12 is turned on by pushing up on the key container 14. Pushing up on the key container 14 activates switches inside the lock box and turns it on with respect to the operation of the electronic access card 11 and the lock box 12. It is immaterial whether the key container is pressed to activate the switches on the lock boxes prior to the time that the electronic access card 11 is inserted between the guide members 22. Thus the key container 14 can be pressed to activate the switches and then the electronic access card can be inserted. Alternatively, the card can be inserted and then the key container can be pressed or the card can be inserted and the key container pressed and then the appropriate keys pressed on the electronic access card 11. Thus it can be seen that the order of doing these steps is immaterial. All that is necessary is that the keys be pressed on the electronic access card and the key container be pushed up within the 20 second programmed interval.

It should be appreciated that if desired, the number of bursts can be decreased as well as the timing between the bursts and still achieve the desired functionality for the electronic access card and the box. Any partial transmission which is received by the lock box from the electronic access card will be ignored.

After the key container has popped open, the real estate agent can take out the electronic access card and place it back in his wallet. He can then take out the house key from the key container 14 and use it to open the door to the property being shown. After the property has been shown, the key is replaced in the key container and the key container is closed.

If it is desired to remove the lock box from the property by removing the shackle 16, this can be readily accomplished by a four-digit shackle code assigned to the lock boxes. The four-digit shackle code assigned to the real estate agent for his lock boxes is typed into the keys 59 of the electronic access card 11 and then the agent would press the "remove securentry box" which thereafter upon moving of the shackle inwardly to operate a switch will cause the shackle to be released and to permit the lock box to be removed from the property. The same lock box can be readily located on another property by reinserting the shackle into the lock box after the shackle has been positioned in an appropriate location on another property being listed.

From the foregoing, it can be seen that the electronic access card is very small in size and in the general form and shape of a credit card. Even though it is so small and compact it is very powerful in that it contains a microprocessor as well as memory to give it very substantial capabilities with respect to storing and receiving information. It also can carry out various operations.

What is claimed is:

1. In an electronic access card having a unique identification number for use by a user having a personal identification number in conjunction with a lock device, a printed circuit board a microprocessor carried by the printed circuit board, a plurality of keys carried by the board, and connected to the microprocessor, a clock coupled to the microprocessor, a battery carried by the printed circuit board and coupled to the microprocessor and means coupled to the microprocessor and to the battery whereby when keys are operated the keys are polled by the microprocessor and information is adapted to be supplied by the microprocessor to the lock device, said means coupled to the microprocessor permitting information to be coupled from the lock device to the card, said microprocessor having means capable of receiving, storing and transmitting encrypted information which includes the unique identification number for the card, the personal identification number of the user of the card and an update code, means controlled by the microprocessor and the clock for invalidating the update code after a predetermined interval of time, said microprocessor also including means for receiving a periodic update for the update code from information inputted through the keys by the user to permit the continued use of the card by the user after insertion of the periodic update for the update code.

2. A card as in claim 1 wherein said means coupled to the microprocessor permits bidirectional communication to and from the lock device.

3. An access card as in claim 1 wherein said means coupled to the microprocessor consists of first and second coils capable of transmitting radio frequency energy.

4. An access card as in claim 1 wherein said means coupled to the microprocessor includes transistor means coupled to the microprocessor and to the transducer means and to the battery.

5. An access card as in claim 1 wherein said means coupled to the microprocessor includes rectifier and filter means.

6. In the combination for use by a user of an access card and a security apparatus having a device movable between open and closed positions and having electronic circuitry therein for controlling movement of said device to the open position, the electronic circuitry including means permitting communication with the access card, the access card comprising a printed circuit board, a microprocessor carried by the printed circuit board, a plurality of keys operable by the user carried by the printed circuit board and electrically coupled to the microprocessor for introducing predetermined codes including an update code and commands into the microprocessor for storage therein, a clock coupled to the microprocessor, a battery carried by the printed circuit board and coupled to the microprocessor, means controlled by the microprocessor and the clock for invalidating the update code after a predetermined interval of time, said microprocessor also including means for receiving a periodic update for the update code from information imputed through the keys by the user to permit continued use of the card by the user after insertion of the periodic update for the update code, coupling means carried by the card adapted to establish communication between the access card and the security apparatus and coupled to the microprocessor and the battery whereby when keys on the keyboard are operated the keys are polled by the microprocessor and information is supplied by the microprocessor to the coupling means, the address card also having means capable of receiving information from the security apparatus through the coupling means of the card.

7. An access card as in claim 1 wherein said access card has provided thereon a bar code which includes the unique identification number for the card.

8. The combination as in claim 6 wherein said access card includes a bar code which has incorporated therein a unique identification number.

9. An access card as in claim 1 together with a label carried by the card which has provided thereon the unique identification number and a call in date in indicia visible to the human eye and a bar code incorporating therein the unique identification number and the call in date.

* * * * *